(12) United States Patent
Hayahi et al.

(10) Patent No.: US 10,879,748 B2
(45) Date of Patent: Dec. 29, 2020

(54) STATOR OF ROTARY ELECTRIC MACHINE AND ROTARY ELECTRIC MACHINE

(71) Applicant: FANUC CORPORATION, Yamanashi (JP)

(72) Inventors: Daisuke Hayahi, Yamanashi (JP); Naoya Hidaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 31 days.

(21) Appl. No.: 16/136,402

(22) Filed: Sep. 20, 2018

(65) Prior Publication Data
US 2019/0157920 A1  May 23, 2019

(30) Foreign Application Priority Data

Nov. 17, 2017  (JP) .................................. 2017-221542

(51) Int. Cl.
*H02K 3/04* (2006.01)
*H02K 1/16* (2006.01)
(Continued)

(52) U.S. Cl.
CPC .................. *H02K 1/16* (2013.01); *H02K 3/12* (2013.01); *H02K 3/48* (2013.01); *H02K 3/50* (2013.01); *H02K 2213/03* (2013.01)

(58) Field of Classification Search
CPC ........................................................ H02K 1/16
(Continued)

(56) References Cited

U.S. PATENT DOCUMENTS 3,375,312 A * 3/1968 Hart ........................ H02K 15/12
264/272.2
3,912,955 A * 10/1975 Simpson .................. H02K 3/51
310/216.004
(Continued)

FOREIGN PATENT DOCUMENTS

CN         1120260 A      4/1996
JP       S53-148102 U    11/1978
(Continued)

OTHER PUBLICATIONS

An Office Action mailed by the Japanese Patent Office dated Jul. 23, 2019, which corresponds to Japanese Patent Application No. 2017-221542 and is related to U.S. Appl. No. 16/136,402.
(Continued)

*Primary Examiner* — Alexander Talpalatski
(74) *Attorney, Agent, or Firm* — Studebaker & Brackett PC

(57) ABSTRACT

A stator of a rotary electric machine comprises: a stator core including multiple slots; multiple coils formed using a winding wound in a distributed fashion so as to pass through the slots; and multiple power lines connected to the coils. The coils have a coil end projecting from an end surface of the stator core. The coils are adjacent to each other in the peripheral direction. A connection between each of the coils and a corresponding one of the power lines is arranged adjacent to a base portion of the coil end on the outer periphery. Each of the power lines starts from the connection to extend along the outer periphery of the coil end to be adjacent to the base portion of the coil end on the outer periphery while extending outwardly in the axis direction from between the coils adjacent to each other in the peripheral direction.

5 Claims, 7 Drawing Sheets

(51) Int. Cl.
*H02K 3/50* (2006.01)
*H02K 3/12* (2006.01)
*H02K 3/48* (2006.01)

(58) Field of Classification Search
USPC .......................................................... 310/208
See application file for complete search history.

(56) References Cited

U.S. PATENT DOCUMENTS

| | | | | |
|---|---|---|---|---|
| 5,898,252 | A * | 4/1999 | Tanaka | H02K 3/528 |
| | | | | 310/214 |
| 5,900,687 | A * | 5/1999 | Kondo | H02K 3/522 |
| | | | | 310/260 |
| 5,970,600 | A * | 10/1999 | Huang | H02K 1/20 |
| | | | | 29/596 |
| 6,800,973 | B2 * | 10/2004 | Futami | H01R 4/2458 |
| | | | | 310/71 |
| 6,958,560 | B2 * | 10/2005 | Holzheu | H02K 3/12 |
| | | | | 310/179 |
| 7,193,345 | B2 * | 3/2007 | Shinzaki | H02K 3/522 |
| | | | | 310/179 |
| 8,653,711 | B2 * | 2/2014 | Burch | H02K 15/0075 |
| | | | | 310/184 |
| 8,916,999 | B2 * | 12/2014 | Imai | H02K 11/33 |
| | | | | 310/71 |
| 2004/0135457 | A1 | 7/2004 | Holzheu et al. | |
| 2010/0026113 | A1 * | 2/2010 | Nakamura | H02K 15/0037 |
| | | | | 310/64 |
| 2010/0026135 | A1 * | 2/2010 | Hussey | H02K 1/16 |
| | | | | 310/216.111 |

FOREIGN PATENT DOCUMENTS

| | | |
|---|---|---|
| JP | S56-133245 U | 10/1981 |
| JP | H09-009545 A | 1/1997 |
| JP | 2002-165396 A | 6/2002 |
| JP | 2006-187146 A | 7/2006 |
| JP | 2015-111975 A | 6/2015 |

OTHER PUBLICATIONS

An Office Action mailed by China National Intellectual Property Administration dated May 11, 2020, which corresponds to Chinese Patent Application No. 201811354234.0 and is related to U.S. Appl. No. 16/136,402 with English language translation.

* cited by examiner

STATOR OF ROTARY ELECTRIC MACHINE AND ROTARY ELECTRIC MACHINE This application is based on and claims the benefit of priority from Japanese Patent Application No. 2017-221542, filed on 17 Nov. 2017, the content of which is incorporated herein by reference.

BACKGROUND OF THE INVENTION

Field of the Invention

The present invention relates to a stator of a rotary electric machine and a rotary electric machine.

Related Art

A stator used in a rotary electric machine such as a motor or a power generator includes multiple coils configured using a winding that is wound around slots of a stator core. The coils are formed by winding the winding in a distributed fashion and have a coil end projecting outwardly in an axis direction from an end surface of the stator core. Each coil is connected to a power line outside the coil end.

If a rotary electric machine with such a stator is a movable rotary electric machine such as a built-in motor used in a movable part, for example, the power line is pulled by the movement of the rotary electric machine to cause a risk of a load to be applied to a connection between each coil and the power line. Hence, to avoid the application of a load on the connection occurring when the power line is pulled in a conventional stator, the power line is arranged above the coil end to extend in a peripheral direction, and the power line and the coil end are integrated securely using a cord-like member.

In a conventional stator, however, arranging the power line above the coil end so as to extend the power line in the peripheral direction causes the problem of a size increase in the axis direction. Specifically, the power line has a large diameter intended to withstand a high voltage. Additionally, the power line includes multiple power lines of a number corresponding to the number of phases of the coils. Arranging all of the power lines along an area above the coil end makes the coil end assume a shape largely projecting outwardly in the axis direction. This has prohibited the size reduction of the stator.

Patent document 1 discloses a technique of reducing the size of a stator in an axis direction by devising a method of routing an end portion of a coil. However, this method is not to solve the foregoing problem that the presence of the power lines makes the coil end largely project outwardly in the axis direction.

Patent Document 1: Japanese Unexamined Patent Application, Publication No. 2015-111975

SUMMARY OF THE INVENTION

The present invention has been made in view of the foregoing problem, and is intended to provide a stator of a rotary electric machine and a motor contributing to size reduction in an axis direction while a power line is arranged to extend along a coil end.

(1) A stator of a rotary electric machine according to the present invention is a stator (stator 1 described later, for example) of a rotary electric machine (motor 10 described later, for example) comprising: a stator core (stator core 2 described later, for example) including multiple slots (slot 21 described later, for example) extending in an axis direction and being separated in a peripheral direction (peripheral direction D2 described later, for example); multiple coils (coil 3 described later, for example) formed using a winding (winding 30 described later, for example) wound in a distributed fashion so as to pass through the slots; and multiple power lines (power line 5 described later, for example) connected to the coils. The coils have a coil end (coil end 4 described later, for example) projecting outwardly in the axis direction (axis direction D1 described later, for example) from an end surface (end surface 23 described later, for example) of the stator core. The coils are adjacent to each other in the peripheral direction. A connection (connection 6 described later, for example) between each of the coils and a corresponding one of the power lines is arranged adjacent to a base portion (base portion 42 described later, for example) of the coil end on the outer periphery. Each of the power lines starts from the connection to extend along the outer periphery of the coil end to be adjacent to the base portion of the coil end on the outer periphery while extending outwardly in the axis direction from between the coils adjacent to each other in the peripheral direction.

(2) In the stator of the rotary electric machine described in (1), the coil end and each of the power lines may be integrated securely with a cord-like member (cord-like member 7 described later, for example).

(3) In the stator of the rotary electric machine described in (1) or (2), the stator may be a two-pole or four-pole stator.

(4) In the stator of the rotary electric machine described in any one of (1) to (3), the rotary electric machine may be a rotary electric machine used in a movable part.

(5) A rotary electric machine according to the present Invention comprises: the stator of the rotary electric machine described in any one of (1) to (4); and a rotor (rotor 12 described later, for example) provided rotatably inside the stator.

The present invention is capable of providing a stator of a rotary electric machine and a rotary electric machine contributing to size reduction in an axis direction while a power line is arranged to extend along a coil end.

DETAILED DESCRIPTION OF THE INVENTION

Figure 1:
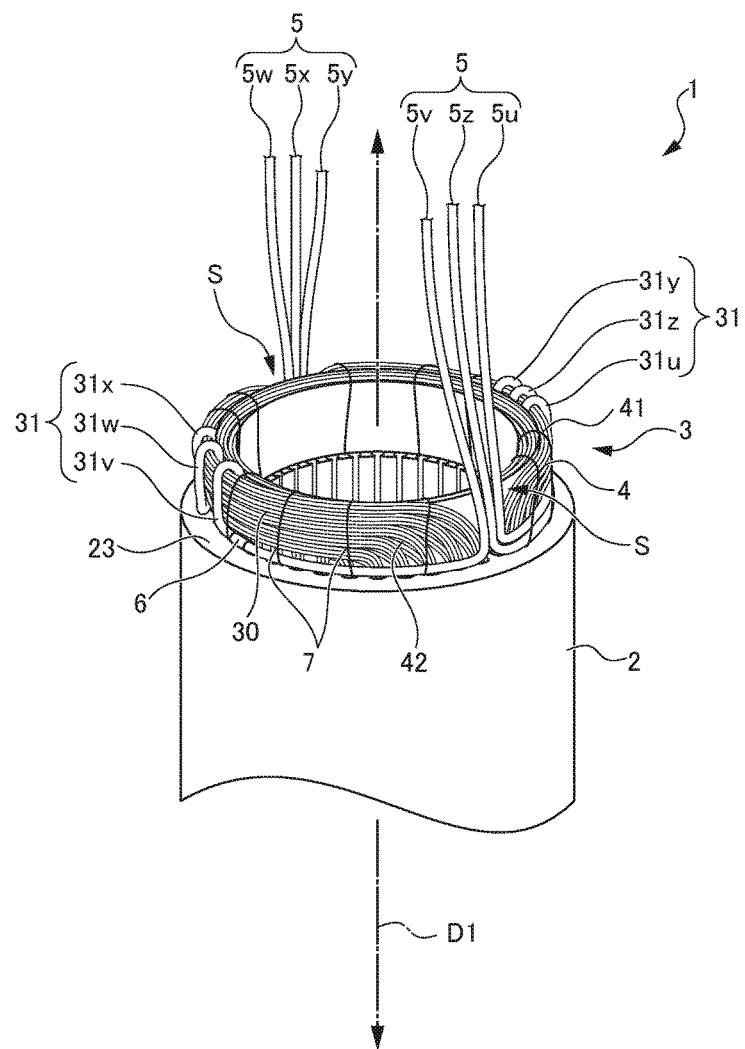
FIG. 1 is a perspective view showing a part of an embodiment of a stator of a rotary electric machine according to the present invention.
Figure 2:
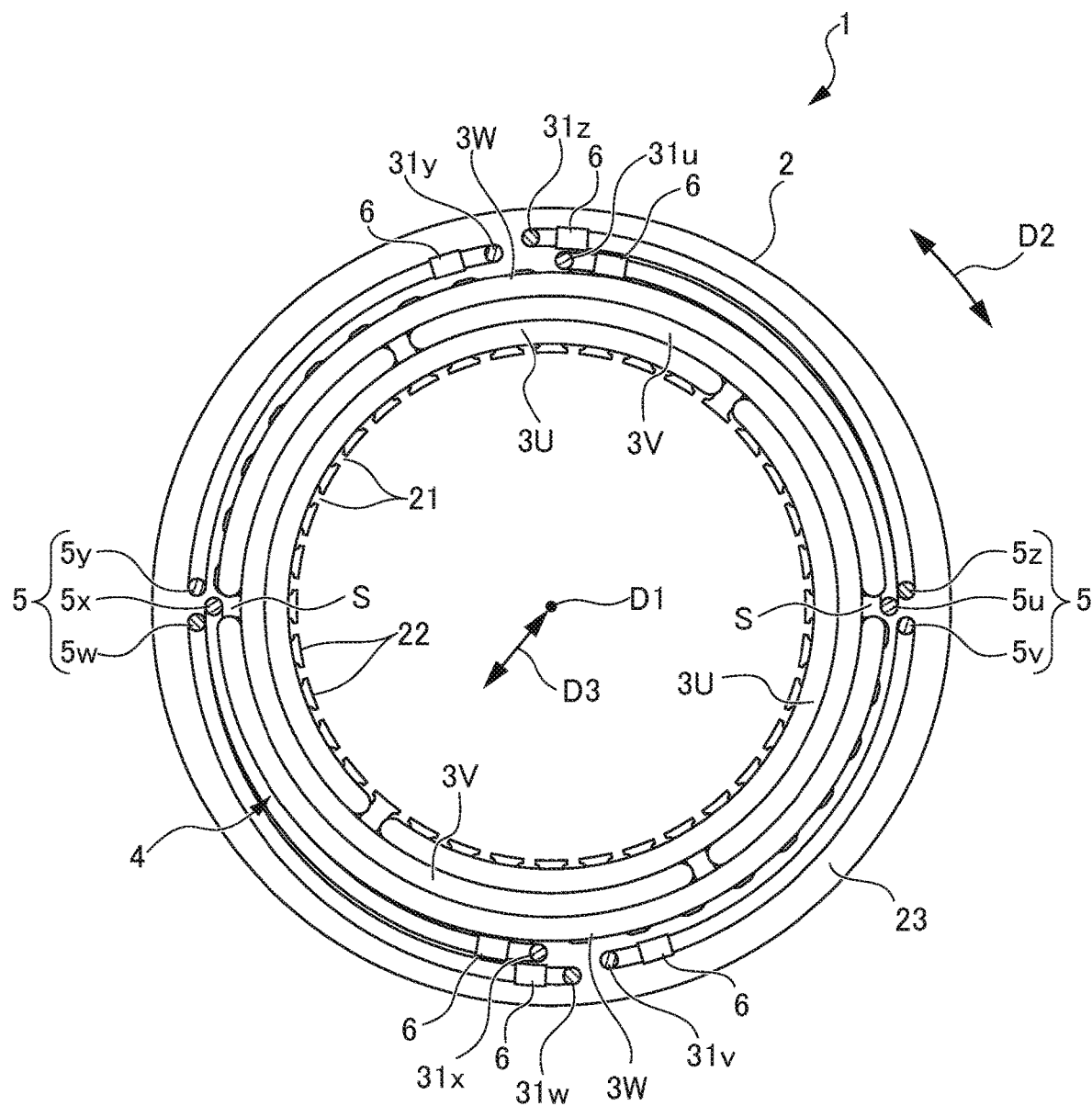
FIG. 2 is a sectional view schematically showing a base portion and its vicinity of a coil end of the stator shown in FIG. 1 taken by cutting the base portion and its vicinity in a direction perpendicular to an axis direction.
Figure 3:
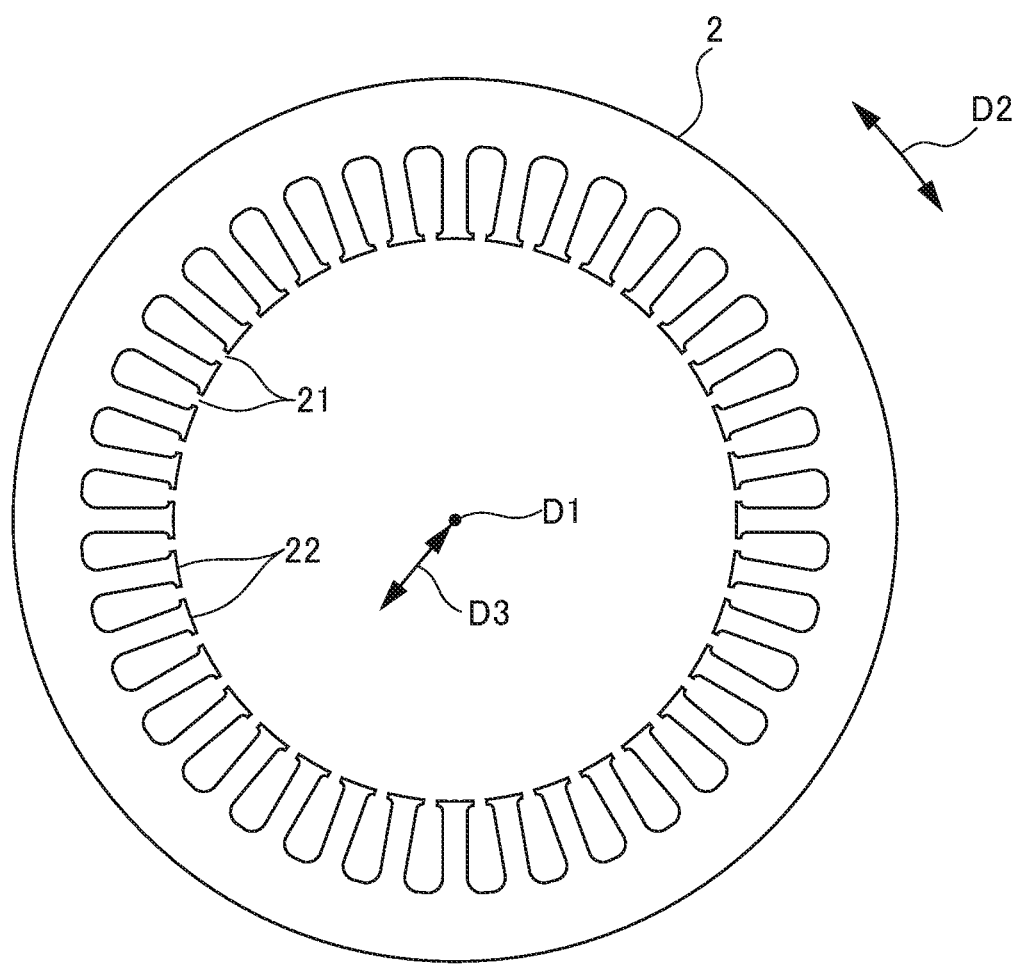
FIG. 3 is a planar view showing a stator core of the stator of the rotary electric machine shown in FIG. 1.

An embodiment of the present invention will be described below using the drawings. FIG. 1 is a perspective view showing a part of an embodiment of a stator of a rotary electric machine according to the present invention. FIG. 2 is a sectional view schematically showing a base portion and its vicinity of a coil end of the stator shown in FIG. 1 taken by cutting the base portion and its vicinity in a direction perpendicular to an axis direction. FIG. 3 is a planar view showing a stator core of the stator of the rotary electric machine shown in FIG. 1. A stator 1 is used together with a rotor 12 (see FIG. 7 and unillustrated in FIGS. 1 and 2) in a rotary electric machine such as a motor or a power generator. As shown in FIGS. 1 and 2, the stator 1 includes a stator core 2 and multiple coils 3.

The stator core 2 is formed by stacking multiple magnetic steel sheets in an axis direction D1. As shown in FIG. 3, the stator core 2 has an inner surface where multiple slots 21 extending in the axis direction D1 are formed to be separated in a peripheral direction D2. Teeth 22 projecting inwardly in a radial direction D3 (inner diameter direction D32 in FIG. 4) are formed between adjacent ones of the slots 21. The stator core 2 shown in this embodiment includes 36 slots 21. However, the number of slots in the stator core 2 is not restricted to 36.

The stator 1 shown as an example in this embodiment is a three-phase two-pole stator. The coil 3 is formed by winding winding 30 so as to pass the winding 30 through the slots 21 in a distributed fashion. As shown in FIG. 2, the coil 3 is configured using two U-phase small coils 3U arranged at innermost positions (inner positions in the radial direction D3), two V-phase small coils 3V arranged outside the U-phase small coils 3U in the radial direction D3, and two W-phase large coils 3W arranged at outermost positions. The two U-phase small coils 3U are adjacent to each other in the peripheral direction D2 at the innermost positions. The two V-phase small coils 3V are adjacent to each other in the peripheral direction D2 outside the U-phase small coils 3U in the radial direction D3. The two W-phase large coils 3W are adjacent to each other in the peripheral direction D2 at the outermost positions.

Each of the U-phase coils 3, the V-phase coils 3, and the W-phase coils 3 is folded back outside the stator core 2 in the axis direction D1, thereby forming a coil end 4 projecting outwardly in the axis direction D1 from an end surface 23 of the stator core 2. The coil end 4 of the coil 3 resulting from the distributed winding is an aggregate of the winding 30 wound to pass through the multiple slots 21. In FIGS. 1 and 2, however, the coil end 4 is illustrated in a simplified fashion to facilitate understanding of the present invention.

Figure 4:
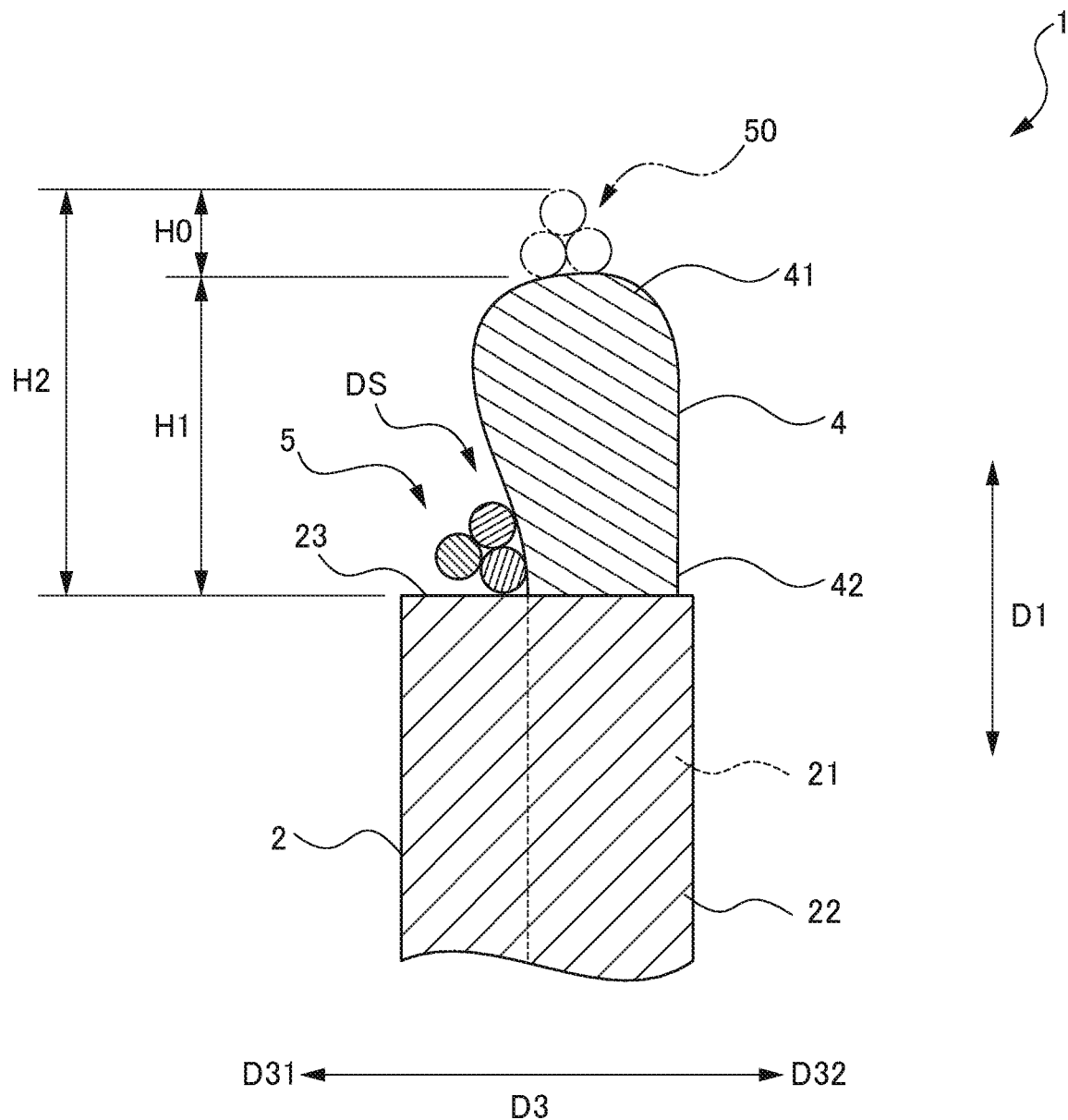
FIG. 4 is a sectional view schematically showing a part of the stator of the rotary electric machine shown in FIG. 1.

As shown in FIG. 4, the coil end 4 receives force acting from the outside of the axis direction D1 so as to compress the coil end 4 under pressure, thereby expanding the coil end 4 outwardly in the radial direction D3 (also called an outer diameter direction D31). Thus, a tip portion 41 of the coil end 4 (outside the stator core 2 in the axis direction. D1) bulges outwardly in the radial direction. D3 more largely than a base portion. 42 of the coil end 4 (adjacent to the stator core 2 and at an inner position in the axis direction D1). At the coil end 4, spaces S are formed in the peripheral direction D2 and between the two W-phase large coils 3W, 3W at the outermost positions. Each of the spaces S has a width corresponding to the width of one tooth 22. Specifically, the two W-phase large coils 3W, 3W are wound around the slots 21 so as to be separated in the peripheral direction D2 at the two spaces S, S as borders separated by an angle of 180 degrees along a periphery.

Each coil 3 has one end portion and an opposite end portion, specifically, an end portion of one outgoing line 31 and an end portion of an opposite outgoing line 31. Each of these end portions is connected to a power line 5. More specifically, one outgoing line 31u of the U-phase small coil 3U is pulled out of the coil end 4 and is connected to a power line 5u through a connection 6. An opposite outgoing line 31x of the U-phase small coil 3U is pulled out of the coil end 4 and is connected to a power line 5x through the connection 6.

One outgoing line 31v of the V-phase small coil 3V is pulled out of the coil end 4 and is connected to a power line 5v through the connection 6. An opposite outgoing line 31y of the V-phase small coil 3V is pulled out of the coil end 4 and is connected to a power line 5y through the connection 6.

One outgoing line 31w of the W-phase large coil 3W is pulled out of the coil end 4 and is connected to a power line 5w through the connection 6. An opposite outgoing line 31z of the W-phase large coil 3W is pulled out of the coil end 4 and is connected to a power line 5z through the connection 6.

The connection 6 is formed using a crimp terminal, for example. Each connection 6 is arranged adjacent to the base portion 42 of the coil end 4 on the outer periphery. The state where the connection 6 is "adjacent" to the base portion 42 of the coil end 4 on the outer periphery means that the connection 6 falls within the range of the end surface 23 of the stator core 2 in the radial direction D3 at the base portion 42 of the coil end 4 on the outer periphery. Specifically, the connection 6 does not go out of the range of the stator core 2 in the radial direction D3. As long as the connection 6 falls within the range of the end surface 23 of the stator core 2 in the radial direction D3, the connection 6 may contact or may not contact the base portion 42 of the coil end 4 on the outer periphery. The connection 6 is arranged as close as possible to the end surface 23 of the stator core 2.

The power lines 5u, 5v, 5w, 5x, 5y, and 5z start from the corresponding connections 6 to extend along the outer periphery of the coil end 4 to be adjacent to the base portion 42 of the coil end 4 on the outer periphery. Further, the power lines 5u, 5v, 5w, 5x, 5y, and 5z extend outwardly in the axis direction D1 from the spaces S formed between the two W-phase large coils 3W at the outermost positions. In this embodiment, the three power lines 5u, 5v, and 5z are bent at one of the spaces S (right space S in FIG. 2), and rise to extend outwardly in the axis direction D1. The other three power lines 5w, 5x, and 5y are bent at the other space S (left space S in FIG. 2), and rise to extend outwardly in the axis direction D1.

As described above, all of the power lines 5 are arranged adjacent to the base portion 42 of the coil end 4 on the outer periphery and are not arranged on the upper surface of the coil end 4. Thus, as shown in FIG. 4, compared to a conventional case where the stator 1 has a coil end length H2 determined by arranging power lines on the upper surface of the coil end 4 (these power lines are indicated as power lines 50 in FIG. 4), the stator 1 having the foregoing configuration has a coil end length H1 (the height of outward projection in the axis direction D1 from the end surface 23 of the stator core 2) shorter than the length H2 by a height H0 corresponding to the power lines 50 on the upper surface of the coil end 4. As a result, the length of the stator 1 in the axis direction D1 is reduced to reduce the size of the stator 1.

As shown in FIG. 4, the power line 5 extending along the outer periphery of the coil end 4 is housed in a dead space DS formed between the base portion 42 of the coil end 4 on the outer periphery and the end surface 23 of the stator core 2. A housing (unillustrated) for the rotary electric machine is generally arranged outside the stator core 2 in the radial direction D3. Housing the power line 5 in the dead space DS eliminates a risk that the power line 5 will go out of the range of the coil end. 4 largely in the radial direction D3, thereby reducing interference between the power line 5 extending along the outer periphery of the coil end 4 and the housing.

Figure 5:
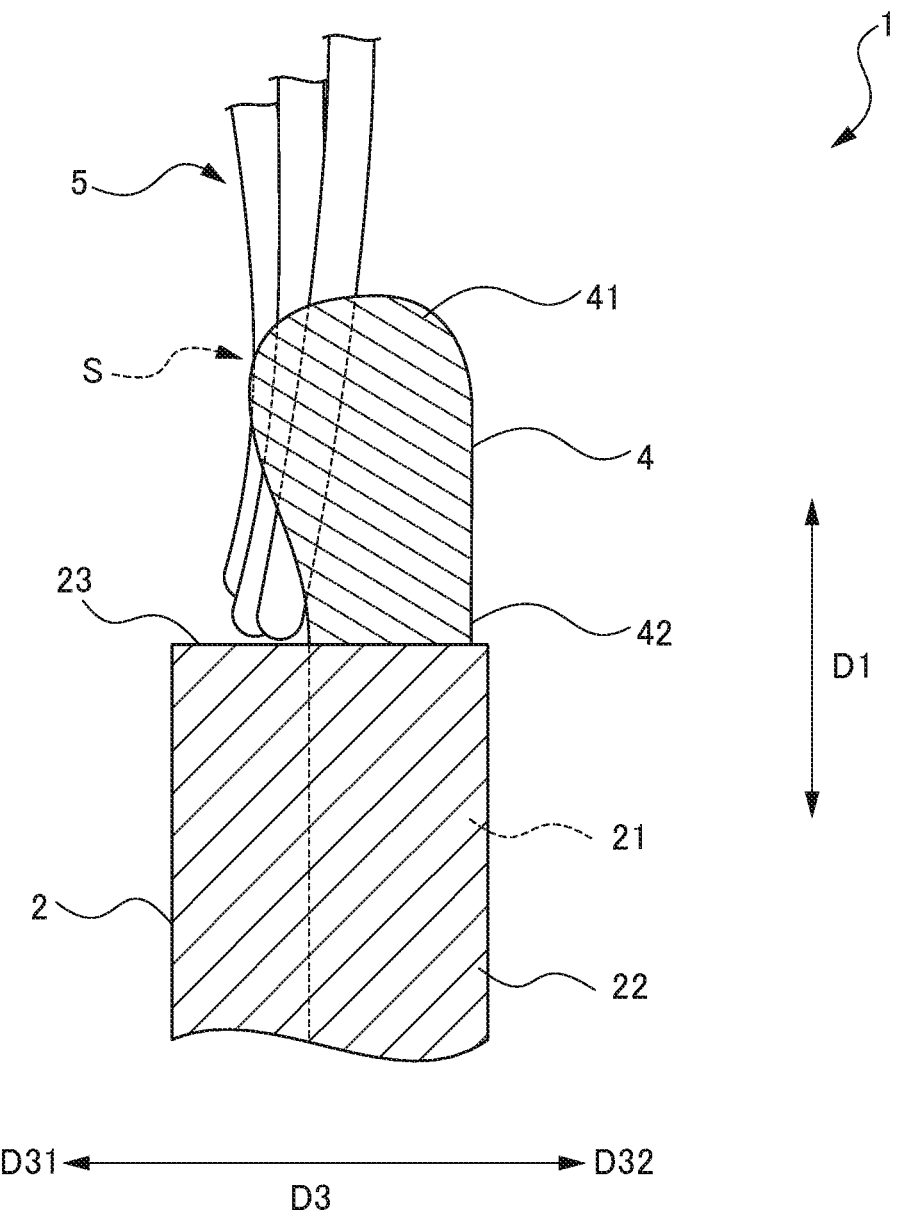
FIG. 5 is a sectional view schematically showing a part of the stator of the rotary electric machine shown in FIG. 1.

Additionally, after the power line 5 rises to extend outwardly in the axis direction D1, the power line 5 also becomes free from the risk of going out of the range of the stator core 2 largely in the radial direction D3. Specifically, the tip portion 41 of the coil end 4 bulges outwardly in the radial direction D3 more largely than the base portion 42 of the coil end 4. Hence, if the power line is to rise from the base portion 42 of the coil end 4 on the outer periphery, it is necessary for the power line 5 to be tilted outwardly from the coil end 4 in the radial direction D3 during the rising for the purpose of bypassing the tip portion 41 of the coil end 4. Meanwhile, the power line 5 is to rise from a position corresponding to the space S between the two W-phase large coils 3W at the outermost positions. Thus, as shown in FIG. 5, the power line 5 is allowed to rise from a position adjacent to the base portion 42 of the coil end 4 on the outer periphery while being caught in the space S. This reduces protrusion of the power line 5 after the rising and reduces the interference between the power line and the housing.

In the stator 1, as shown in FIG. 1, the coil end 4 and the power line 5 are integrated securely with a cord-like member 7 such as a binding cord, for example. Thus, if the rotary electric machine including the stator 1 is a rotary electric machine used in a movable part, for example, and even if movement of the rotary electric machine generates a pulling force that acts on the power line 5, the connection 6 between the power line 5 and the outgoing line 31 is free from the risk of an application of a load. Thus, resistance to pulling is ensured at a level comparable to those in conventional cases.

In the embodiment described above, a three-phase two-pole stator 1 is shown as an example. However, the stator 1 is not limited to a two-pole stator but may be a stator with four poles or more. However, an increase in the number of poles increases the number of the power lines 5, making it difficult to arrange all of the power lines 5 along the base portion 42 of the coil end on the outer periphery. Hence, the number of poles in the stator 1 is desirably two or four.

Figure 6:
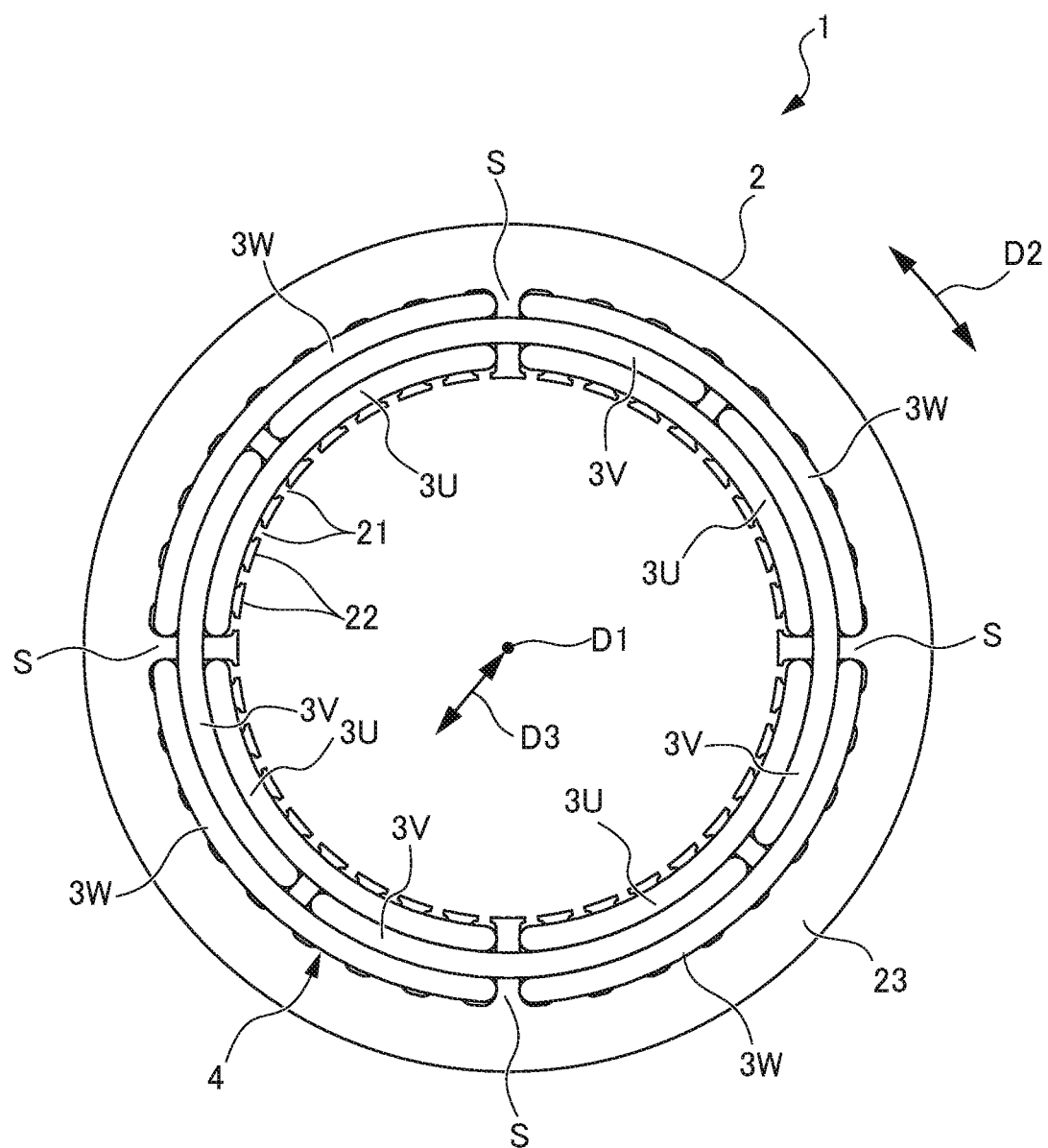
FIG. 6 is a sectional view schematically showing a base portion and its vicinity of a coil end of a stator according to a different embodiment of the present invention taken by cutting the base portion and its vicinity in a direction perpendicular to an axis direction.

FIG. 6 shows an example of the stator 1 with 36 slots and four poles. Like FIG. 2, FIG. 6 is a sectional view schematically showing the base portion 42 and its vicinity of the coil end 4 of the stator 1 taken by cutting the base portion 42 and its vicinity in a direction perpendicular to the axis direction. A part with the same sign as that in FIG. 2 mean that those parts have the same configuration. In this four-pole stator 1, four spaces S are formed in the peripheral direction D2 between four W-phase large coils 3W adjacent to each other in the peripheral direction D2 at outermost positions. In this configuration, arranging the power line 5 (unillustrated in FIG. 6) so as to make the power line 5 rise from any one or more of the four spaces S achieves an effect comparable to the foregoing effect.

In the stator 1 shown in FIGS. 1 and 2, the power line 5 is formed to extend a distance about a quarter of the outer periphery of the coil end 4 along the outer periphery of the coil end 4 and to rise at the space S. However, this is not the only possible configuration of the power line 5. The power line 5 may be formed to extend a distance corresponding to a quarter of the outer periphery of the coil end 4 or more along the outer periphery of the coil end 4 and to rise at the space S.

Figure 7:
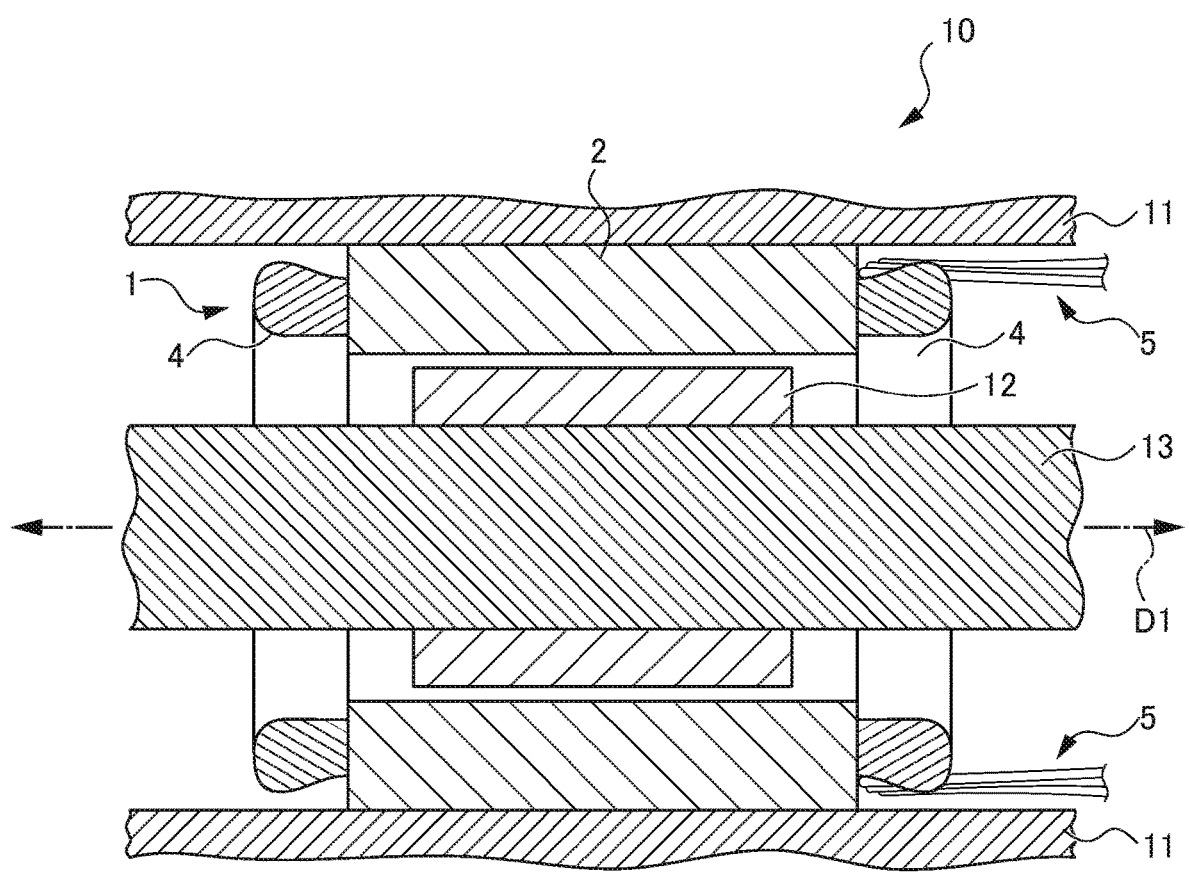
FIG. 7 is a sectional view showing the configuration of a motor in outline corresponding to an embodiment of the rotary electric machine of the present invention.

The rotary electric machine of the present invention will be described next. FIG. 7 is a sectional view showing the configuration of a motor in outline corresponding to an embodiment of the rotary electric machine. A motor 10 includes the foregoing stator 1 incorporated into a housing 11. The power line 5 in the stator 1 starts from one coil end 4 (right coil end 4 in FIG. 7) to extend outwardly in the axis direction D1. The rotor 12 is arranged inside the stator 1. The rotor 12 is supported on a rotary axis 13 extending in the axis direction D1 and is arranged to be rotatable about the rotary axis 13. The power line in the stator 1 is connected to a power supply (unillustrated) provided outside the motor 10. In this configuration, operating power is supplied from the power supply to each coil 3 in the stator 1 to rotate the rotor 12 about the rotary axis 13.

As described above, the length of the stator 1 is short in the axis direction D1 and is reduced in size accordingly. This allows for a reduction in the length of the motor 10 in the axis direction D1. As shown in FIGS. 1 and 2, the power line 5 and the coil end 4 in the stator 1 are integrated securely with the cord-like member 7. Thus, if the motor 10 is used in a movable part and even if movement of the motor 10 generates a pulling force that acts on the power line 5, the connection 6 (unillustrated in FIG. 7) between the power line 5 and an outgoing line is free from the risk of an application of a load.

EXPLANATION OF REFERENCE NUMERALS

1 Stator
2 Stator core
21 Slot
23 End surface of stator core
3 Coil
30 Winding
4 Coil end
42 Base portion
5 Power line
6 Connection
7 Cord-like member
10 Motor (rotary electric machine)
12 Rotor

What is claimed is:

1. A stator of a rotary electric machine comprising: a stator core including multiple slots extending in an axis direction and being separated in a peripheral direction;
multiple coils formed using a winding wound in a distributed fashion so as to pass through the slots; and
multiple tube-shaped power lines connected to the coils, wherein
the coils have a coil end projecting outwardly in the axis direction from an end surface of the stator core,
the coils are adjacent to each other in the peripheral direction,
a connection between each of the coils and a corresponding one of the power lines is arranged adjacent to a base portion of the coil end on the outer periphery, and
each of the power lines starts from the connection to extend along the outer periphery of the coil end to be adjacent to the base portion of the coil end on the outer periphery, and extends in the axis direction away from the stator core from a space located between two of the coils that are adjacent to each other in the peripheral direction at an outermost position of the coil end to extend outwardly in the axis direction.

2. The stator of a rotary electric machine according to claim 1, wherein the coil end and each of the power lines are integrated securely with a cord.

3. The stator of a rotary electric machine according to claim 1, wherein the stator is a two-pole or four-pole stator.

4. The stator of a rotary electric machine according to claim 1, wherein the rotary electric machine is a rotary electric machine used in a movable part.

5. A rotary electric machine comprising: the stator of the rotary electric machine according to claim 1; and
a rotor provided rotatably inside the stator.

* * * * *